April 26, 1960

H. C. JÖNSON 2,934,197

CONVEYING EQUIPMENT

Filed May 18, 1956

Inventor
H. C. Jönson
By Glascock Downing Seebold
Attys.

April 26, 1960  H. C. JÖNSON  2,934,197
CONVEYING EQUIPMENT

Filed May 18, 1956  3 Sheets-Sheet 2

Inventor
H. C. Jönson
By Glascock Downing Seebold
Attys.

Inventor
H. C. Jönson
By Glascock Downing Seebold
Attys

United States Patent Office 2,934,197
Patented Apr. 26, 1960

2,934,197
CONVEYING EQUIPMENT

Henry C. Jönson, Kungsbacka, Sweden, assignor to Aktiebolaget Valida Maskiner, Kungsbacka, Sweden, a corporation of Sweden Application May 18, 1956, Serial No. 585,645

6 Claims. (Cl. 198—38)

The present invention generally relates to conveying equipment, and more particularly to conveyors of the class comprising a longitudinally movable belt such as an endless chain and a plurality of devices adapted to carry the objects to be transported, which devices are engageable with the belt for movement therewith when desired.

A primary object of the present invention is to provide a conveying equipment of the kind referred to which is particularly adapted for use in industrial applications where the assembly or handling of an item of production is carried out in separate operations at a number of stations, such as in the radio, foodstuff and ready-made clothing industries, and where article carriers or transport boxes containing materials or goods are transferred by the conveyor to predetermined stations where certain pieces of work are to be carried out.

Another object of the present invention is to provide conveying equipment which is simple and inexpensive in production.

A further object of the invention is to provide conveying equipment of the kind referred to which includes means automatically rendered effective at one or more predetermined working stations along the path of conveyance to unload the goods carried by the conveyor at such stations when desired.

According to the invention the means which is automatically rendered effective at one or more predetermined working stations along the path of conveyance to unload the goods carried by the conveyor, may comprise a pusher in each such station which is movable by power derived from the conveyor transversely of the path of conveyance and which is arranged to abut and push the article carrier off the conveyor when so desired.

Further features and advantages of the invention will appear from the description hereinafter of a preferred embodiment thereof in conjunction with the accompanying drawings, in which.

Figure 4:
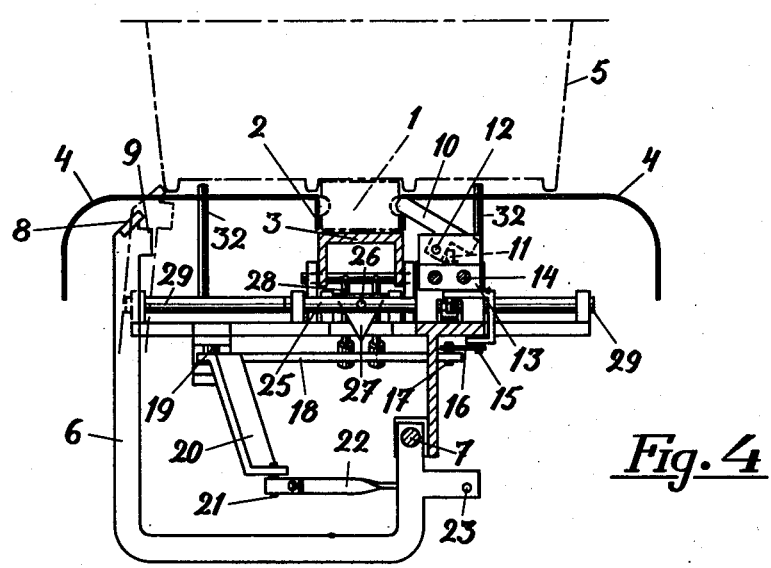
Fig. 4 is a vertical sectional view of an unloading station where transport boxes or the like are to be removed from the conveyor.
Figure 7:
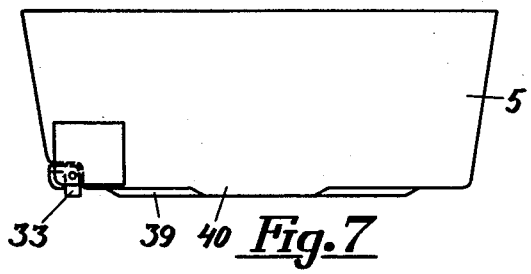
Fig. 7 is a side elevation of a transport box forming a part of the conveying equipment.
Figures 8, 9:
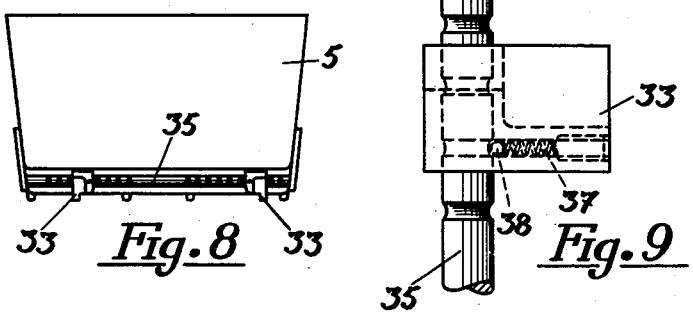
Fig. 8 is a left-hand end view of the box illustrated in Fig. 7.
Fig. 9 is an enlarged, fragmentary view of an abutment carried by the transport box in a manner to be adjustable into different positions transversely of the path of conveyance.

Referring now to Fig. 4 of the drawings a conveying belt or chain 1 is guided in a runway 2 substantially channel-shaped in cross-section, the bottom wall of this runway or channel 2 being formed by the web portion of an inverted channel bar 3 while its lateral walls are formed by opposite depending flanges of sheet-metal plates 4. Numeral 5 designates a transport box or article carrier adapted to be conveyed along the path of conveyance by the conveying belt 1.

Figure 1:
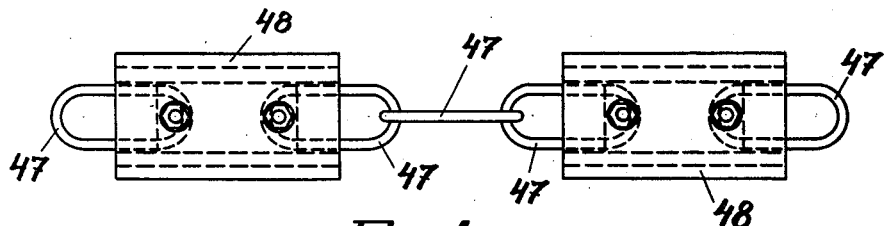
Fig. 1 is a fragmentary plan view of a fragmentary portion of the novel conveying belt or chain adapted for use in the present invention.
Figure 2:
Fig. 2 is a side elevation of the same portion of the conveying belt.
Figure 3:
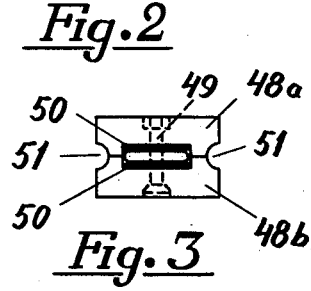
Fig. 3 is an end view as seen from the right in Fig. 2.

The conveying belt, as will be best seen from the enlarged detail Figs. 1 to 3, may comprise a chain made up of a multiplicity of interconnected links. Two kinds of links are employed, viz. conventional closed enlongated chain links 47 and block-shaped links 48, the latter being interconnected with and interposed between the links 47 and forming part of the conveying belt. The blocks 48 are disposed at comparatively short intervals along the belt and are substantially parallelepipedic as well as being somewhat elongated in the longitudinal direction of the conveyor. The blocks 48 serve the purpose of carrying the objects to be transported, i.e., in the present case, the boxes 5 which contain materials or goods. Each block 48 consists of two interconnected parts 48a and 48b clamped together by bolts and nuts 49, for instance. The two mutually contacting surfaces of these parts have corresponding recesses 50 formed therein extending axially inwardly from each end of the block so as to form together a recessed opening in each end portion of the block. Introduced in each such end opening is one end portion of a closed chain link 47 which is retained therein by one or the other, respectively, of the two bolts 49, as will appear most clearly from Fig. 1. The blocks 48 may be made of wood or any suitable other material, for instance a press molded material, such as a plastic or the like, and this material should either have anti-friction characteristics inherently, or the blocks should be subjected to any suitable treatment tending to minimize the frictional forces developed between the blocks 48 and the runway 2 with which they cooperate. It will be seen from Fig. 3 that each block has formed in its vertical longitudinally extending sides grooves 51 which extend in the longitudinal direction of the block and which serve to ensure the accurate guidance of the conveying belt, particularly along certain curved portions of the path where the belt may have a tendency toward twisting itself about its longitudinal axis.

As illustrated in Fig. 4, each plate 4 is bent at right angles, one bent-off leg forming one of the two lateral walls of the runway 2 while the other leg extends initially in a horizontal direction outward from the runway 2 and is then curved downward at its outer edge portion. Further, the horizontally extending leg or platform portions are at a slightly lower level than the top surfaces of the blocks 48 whereby the boxes 5 are normally prevented from contacting these platform portions which, however, are effective on possible tilting movements of the boxes to serve as supporting surfaces for the longitudinal bottom corners of the boxes to prevent the boxes from turning over.

Disposed beneath the plates 4 at each working station is an arrangement according to the invention adapted to remove boxes 5 from the conveyor by effecting displacement of each box transversely relative to the path of conveyance and carrying the box to a predetermined position by the side of this path, for instance onto a work table, a shelf or the like, the latter, however, being omitted in Figs. 4 to 9 for the sake of clarity. This arrangement according to the invention comprises an actuating arm or pusher 6 which is movable in a plane extending transversely relative to the path of conveyance and which arm is mounted at one end so as to be rockable about a pivot 7 which is disposed below the conveyor and the axis of which extends in substantially parallel relation to the longitudinal axis of the path of conveyance. The other end of the arm 6 is provided with a cross-piece 8 which is adapted to engage the side of the box 5 as indicated in broken lines in Fig. 4. The last-mentioned end of the arm 6 further has formed thereon a shoulder 9 which is adapted to engage the bottom portion of the box as the arm 6 continues its movement to push the box 5 off the conveyor belt 1.

The actuating arm 6 is arranged to be moved by the conveyor belt 1 through the intermediary of a movement transmitting arrangement. This movement transmitting arrangement comprises a latch 10 which is engageable with the conveyor belt 1 when it swings from a neutral or inoperative position, as indicated in Fig. 4 into an operative position in which the latch 10 is engageable by the front end surface of a block 48.

Figure 5:
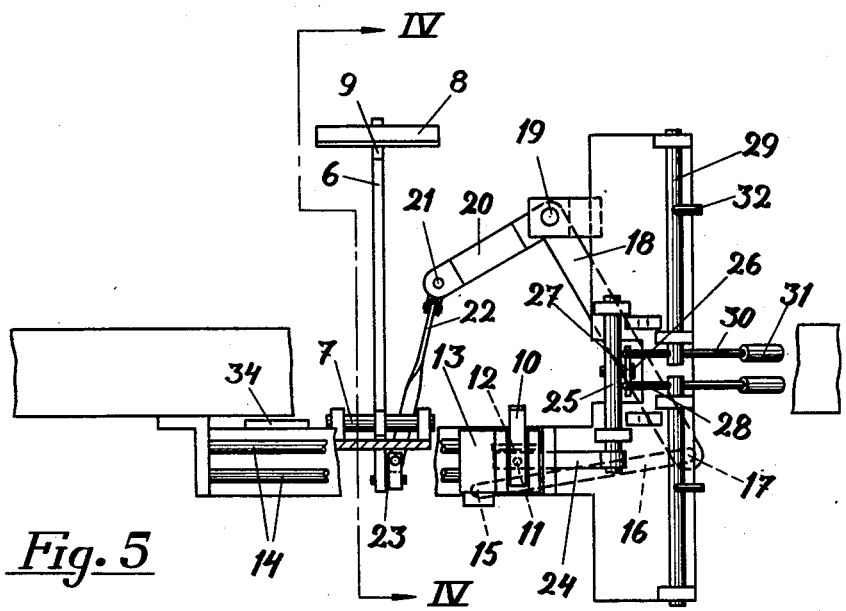
Fig. 5 is a diagrammatic and fragmentary top plan view corresponding to Fig. 4, certain elements of the conveying equipment being omitted.
Figure 6:
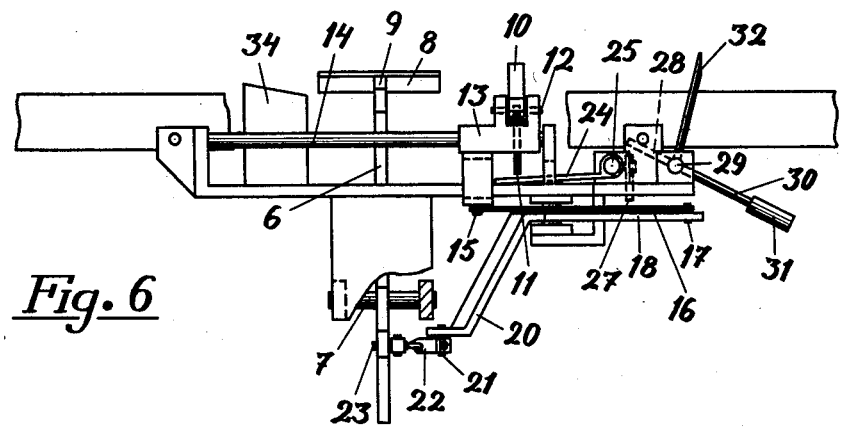
Fig. 6 is a sectional view taken along the line VI—VI in Fig. 5.

The latch 10 is a double-armed lever, one arm of which is adapted to selectively engage the conveyor whereas the other arm thereof is actuatable by a vertically reciprocable pin 11 to move the latch 10 into its operative position. The latch 10 is rockable about a pivot 12 and is so devised as to be maintained by gravity in either its inoperative position or its operative position. The latch 10, as will be seen from Figs. 4 to 6, is mounted in a runner 13 which is slidable along two rods 14 extending in parallel relation to the path of conveyance. The runner 13 is pivotally connected at its underside, at 15, to one end of a link 16 the other end of which is pivotally connected, at 17, to one arm 18 of a bell crank lever. The latter is rockable about a vertical pivot 19 mounted in the frame, and the other arm 20 thereof is offset downwardly and is pivotally connected, at 21, to one end of a link 22. The other end of the link 22 is pivotally connected with the arm 6 at 23.

The pin 11 is movable upward to actuate the latch 10 through the intermediary of an arm 24 which is rigidly mounted on an axle 25 (Fig. 6). This axle 25 carries a cross-pin 26 (Fig. 5) on which is freely journalled a triangular plate 27 which is so arranged as to be able to centralize itself by gravity in a position with one of its edges extending horizontally above the pin 26, as can be seen in Fig. 4. Disposed on either side of the cross-pin 26 and above the plate 27 is one of a pair of rockable arms 28, the two arms 28 being adapted to act on the plate 27 simultaneously by being urged against its upper edge from above to thereby turn the axle 25 in a clockwise direction (Fig. 6). This will rock the arm 24 upwardly carrying with it the pin 11 which will then actuate the latch 10 so that the latter is rocked from its inoperative position into its operative position. The arrangement is so devised that the rocking of either of the arms 28 alone will merely turn the plate 27 about the cross-pin 26 without any rotation of the axle 25.

Each arm 28 is secured to an axle 29 which, as in the case of the axle 25, is mounted in the frame (Fig. 5). Each axle 29 is provided with an arm 30 carrying a weight 31 which tends to rotate the axle 29 in a sense to urge the arm 28 towards an upper limit position in which the arm 28 is spaced above the upper edge of the plate 27. In addition, each axle 29 is provided with an upwardly projecting arm 32 which is adapted to be engaged by an abutment 33 associated with a transport box 5 (see Figs. 7 to 9). Such engagement occurs in a direction from right to left as seen in Figs. 5 and 6, causing the associated axle 29 to be turned counter-clockwise (Fig. 6). When both of the arms 32 are engaged by an abutment 33 on an article carrier or box 5 the pin 11 will be lifted by the arm 24 which then engages a stop, preventing further rocking of the two arms 32. Through this restricted angular displacement of the arms 32 the latter will form stop members for the box 5 in that the arms 32 in their limit positions will still be in engagement with the dogs 33 at the rear end portion of the bottom of the box 5. On the other hand if only one of the arms 32 is engaged by an abutment 33 on a box 5 the engaged arm 32 will merely cause idle swinging of the triangular plate 27 and will be free to rock far enough in a counter-clockwise direction (Fig. 6) to permit the box 5 to pass uninterruptedly through the unloading station.

For returning the latch 10 to its inoperative position a cam 34 (Fig. 6) is provided at the end of the lengthwise path of movement of the latch 10 and slide 13.

Each article carrier or box 5, as already indicated hereinbefore, is provided with two abutments 33 each one adapted to cooperate with a corresponding one of the arms 32. Each abutment 33 is displaceable along a rod 35 attached to the box and extending transversely of the path of conveyance. To enable each abutment 33 to be adjusted to different positions of displacement to align the positions of the abutments with those of the arms 32 at the particular station at which the box is preselected to be removed, the rod 35 is provided with a plurality of annular grooves 36 adapted to be engaged by a spring loaded ball 38 located in a recess in the abutment 33, Fig. 9.

Each box 5 is further provided on its underside with a plurality of ridges 39, 40 two of which, 39, are intended to cooperate with the lateral edges of the blocks 48 thereby to guide the movement of the box, whereas the other two ridges 40, being disposed at the lower longitudinal corners of the box, are adapted, when necessary, to cooperate with the supporting plates or platforms 4.

Figure 10:
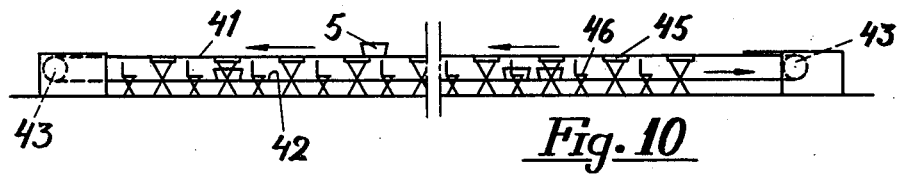
Fig. 10 is a diagrammatic elevational view, partly broken away, of a conveying installation for which the present invention is particularly well adapted.
Figure 11:
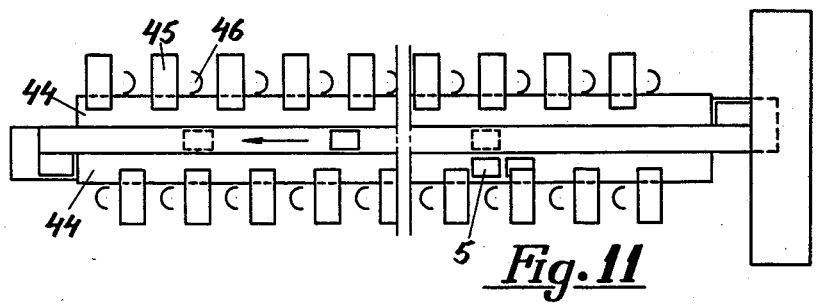
Fig. 11 is a top plan view corresponding to Fig. 10.

Referring now to Figs. 10 and 11, numeral 41 designates the upper run and numeral 42 the lower run of an endless conveyor belt or chain which is looped about two end supporting wheels 43. In the case illustrated the lower run 42 is arranged to convey boxes 5 containing certain pieces of material whereas the upper run 41 is arranged to convey empty boxes to the starting position at the left-hand end of the conveyor. Disposed flush with the lower run 42 on either side of the conveyor is a shelf 44 onto which the boxes 5 are displaceable by the novel arrangement according to the present invention as described hereinbefore. Working tables are designated by 45 and chairs for the workers by 46. It may further be mentioned that an elevator may be associated with each end of the conveyor and adapted to move the boxes from the lower to the upper run, or vice versa, and in this connection also equipments according to the invention may be provided for moving the boxes transversely of the conveyor to these elevators.

The operation of the novel mechanism will be briefly reviewed. A transport box 5, the abutments 33 of which have been adjusted into positions corresponding to the positions of the arm 32 in a certain station, is advanced by the conveyor belt into such station. The abutments 33 disposed at the rear edge of said box will impinge on the arms 32 causing the latter to be swung simultaneously counter-clockwise (Fig. 6). As the arms 32 have been swung to a sufficient extent to raise the pin 11 and thereby to cause the latch 10 to be moved into its operative position, the continued angular movement of the arms 32 will be prevented so that these arms will positively stop the advancing movement of the box. Since the latch 10 has now been moved into its operative position, the front end of an advancing block 48 of the conveying chain will engage the latch 10 and cause the same to be displaced along the rods 14 in a direction from right to left as seen in Figs. 5 and 6. This displacement of the element 10 will swing the link 16, the bell crank levers 18, 20 and the link 22 so that the arm 6, in its turn, will be rocked in a clockwise direction (Fig. 4). The cross-piece 8 and shoulder 9 will then engage the adjacent lateral surface and the adjacent ridge 40, respectively, of the box, whereby the box will be displaced transversely of the conveyor onto a proper one of the shelves 44 (see Figs. 10 and 11). This displacement of the box 5 will release the arms 32 whereupon by the action of the weights 31, the axles 29 will be rotated in a clockwise direction (Fig. 6) into their starting position as shown. At the end of its path of movement, the element 10 will engage the cam 34 and will be returned to its neutral or inoperative position. Thus, the whole of the leverage and linkage system will be returned to the starting position inasmuch as the arm 6 will be rocked by gravity in a counter-clockwise direction (Fig. 4).

It is understood that the structural arrangement of the invention is not, of course, restricted to the single embodiment thereof as hereinbefore described and as illustrated in the accompanying drawings, since the same is susceptible of various modifications and variations without departing from the scope of the invention.

What I claim is:

1. In a conveyor the combination of an elongated conveyor element movable longitudinally through a closed path; an article carrier; abutment means carried by said article carrier; means on said conveyor element for engaging and moving said article carrier along a portion of said path; and at least one unloading station in said portion of said path, said unloading station including a pusher movable transversely of the path through which said article carrier is moved by said conveyor element to abut and push said article carrier from said conveyor element, actuating means engageable by said abutment means carried by said article carrier and movable thereby when said article carrier moves into said unloading station, and means movable by said actuating means into engagement with said conveyor element for transmitting longitudinal movement of said conveyor element to said pusher to move said pusher transversely of said conveyor element.

2. In a conveyor system the combination of an elongated conveyor element movable longitudinally through a closed path; a plurality of article carriers; abutment means; means carried by each of said article carriers for securing said abutment means in any of a plurality of positions upon said article carrier; means on said conveyor element for engaging and moving said article carriers along a portion of said path; and a plurality of unloading stations in said portion of said path, each of said unloading stations including a pusher movable transversely of the path through which said article carriers are moved by said conveyor element to selectively abut and push said article carriers from said conveyor element, actuating means positioned variously in each of said unloading stations so as to be engageable only by the abutment means secured in a particular position upon one or more of said article carriers and movable thereby when an article carrier with appropriately positioned abutment means moves into said unloading station, and means movable by said actuating means into engagement with said conveyor element for transmitting longitudinal movement of said conveyor element to said pusher to move said pusher transversely of said conveyor element.

3. In a conveyor the combination of an elongated conveyor element movable longitudinally through a closed path; an article carrier; abutment means carried by said article carrier; means on said conveyor element for engaging and moving said article carrier along a portion of said path; and at least one unloading station in said portion of said path, said unloading station including a pusher movable transversely of the path through which said article carrier is moved by said conveyor element to abut and push said article carrier from said conveyor element, actuating means engageable by said abutment means carried by said article carrier and movable thereby when said article carrier moves into said unloading station, stop means for holding said article carrier against further movement with said conveyor element, and means movable by said actuating means into engagement with said conveyor element for transmitting longitudinal movement of said conveyor element to said pusher to move said pusher transversely of said conveyor element.

4. In a conveyor system the combination of an elongated conveyor element movable longitudinally through a closed path; a plurality of article carriers; abutment means; means carried by each of said article carriers for securing said abutment means in any of a plurality of positions upon said article carrier; means on said conveyor element for engaging and moving said article carriers along a portion of said path; and a plurality of unloading stations in said portion of said path, each of said unloading stations including a pusher movable transversely of the path through which said article carriers are moved by said conveyor element to selectively abut and push said article carriers from said conveyor element, actuating means positioned variously in each of said unloading stations so as to be engageable only by the abutment means secured in a particular position upon one or more of said article carriers and movable thereby when an article carrier with appropriately positioned abutment means moves into said unloading station, means for limiting said movement of said actuating means whereby said actuating means is effective after said limited movement to hold said last-named article carrier against further movement with said conveyor element, and means movable by said actuating means into engagement with said conveyor element for transmitting longitudinal movement of said conveyor element to said pusher to move said pusher transversely of said conveyor element.

5. In a conveyor the combination of an elongated conveyor element movable longitudinally through a closed path; an article carrier; abutment means carried by said article carrier; means on said conveyor element for engaging and moving said article carrier along a portion of said path; and at least one unloading station in said portion of said path, said unloading station including a slide movable for a limited distance in a direction parallel with said portion of said path, a lever movable transversely of said portion of said path to abut and push said article carrier from said conveyor element, a link connecting said slide with said lever, actuating means engageable by said abutment means carried by said article carrier and movable thereby when said article carrier moves into said unloading station, and means carried by said slide and movable by said actuating means into engagement with said conveyor element for transmitting longitudinal movement of said conveyor element to said slide and through said link to said lever to cause said lever to push said object from said conveyor element.

6. In a conveyor system the combination of an elongated conveyor element movable longitudinally through a closed path; a plurality of article carriers; abutment means; means carried by each of said article carriers for securing said abutment means in any of a plurality of positions upon said article carrier; means on said conveyor element for engaging and moving said article carriers along a portion of said path; and a plurality of unloading stations in said portion of said path, each of said unloading stations including a slide movable for a limited distance in a direction parallel with said portion of said path, a lever movable transversely of said portion of said path to selectively abut and push said article carriers from said conveyor element, a link connecting said slide with said lever, actuating means positioned variously in each of said unloading stations so as to be engageable only by the abutment means secured in a particular position upon one or more of said article carriers thereby when said article carrier with appropriately positioned abutment means moves into said unloading station, and means carried by said slide and movable by said actuating means into engagement with said conveyor element for transmitting longitudinal movement of said conveyor element to said slide and through said link to said lever to cause said lever to push said article carrier from said conveyor element.

References Cited in the file of this patent

UNITED STATES PATENTS

| | | |
|---|---|---|
| 540,617 | Maxon | June 4, 1895 |
| 871,795 | Grant et al. | Nov. 26, 1907 |
| 2,253,572 | Mitchell | Aug. 26, 1941 |
| 2,279,207 | Schenk | Apr. 7, 1942 |
| 2,516,985 | Hecht | Aug. 1, 1950 |